United States Patent [19]
Alvarez et al.

[11] 4,208,035
[45] Jun. 17, 1980

[54] METAL GATE VALVE SEAT HAVING A FLEXIBLE FRONT LIP FACE SEAL

[75] Inventors: Patricio D. Alvarez, Rosenberg; Manmohan S. Kalsi, Houston, both of Tex.

[73] Assignee: ACF Industries, Incorporated, New York, N.Y.

[21] Appl. No.: 877,592

[22] Filed: Feb. 13, 1978

[51] Int. Cl.² .......................... F16K 3/02; F16K 39/04
[52] U.S. Cl. ...................... 251/196; 251/328
[58] Field of Search ............... 251/328, 334, 174, 317, 251/203, 196

[56] References Cited

U.S. PATENT DOCUMENTS

| | | | |
|---|---|---|---|
| 1,756,615 | 4/1930 | Wolff | 251/328 |
| 1,874,405 | 8/1932 | Wood | 251/328 |
| 3,273,855 | 9/1966 | Wells | 251/174 |
| 3,433,250 | 3/1969 | Hagihara | 251/334 X |
| 4,124,194 | 11/1978 | Alvarez | 251/174 X |

*Primary Examiner*—Arnold Rosenthal
*Attorney, Agent, or Firm*—Eugene N. Riddle

[57] ABSTRACT

A gate valve has annular metal seats mounted in seat pockets around the inlet and outlet passageways at the valve chamber. Each of the seat members has a front face which includes an outer seal surface around the outer perimeter of the seat and a flexible annular metal lip around the inner perimeter of the seat. The lip has an inner seal surface on its free end in spaced concentric relation to the outer seal surface and maintains a fluid-tight seal with the gate while deflecting to compensate for deformations of the valve body that would otherwise affect the seal. The inner peripheral surface of the seat has an annular groove which defines the back surface of the lip which tapers from the base to the free extending end thereof. Each of the seat members has a back face which rests in contact with the bottom outer peripheral portion of the associated seat pocket. The seat member preferably has an annular flexible member extending from its back face which may be welded to the valve body. The flexible lip and flexible member deform to compensate for deformations of the valve body so the seat can maintain sealing contact with the gate when the valve is in the opened and the closed positions.

9 Claims, 8 Drawing Figures

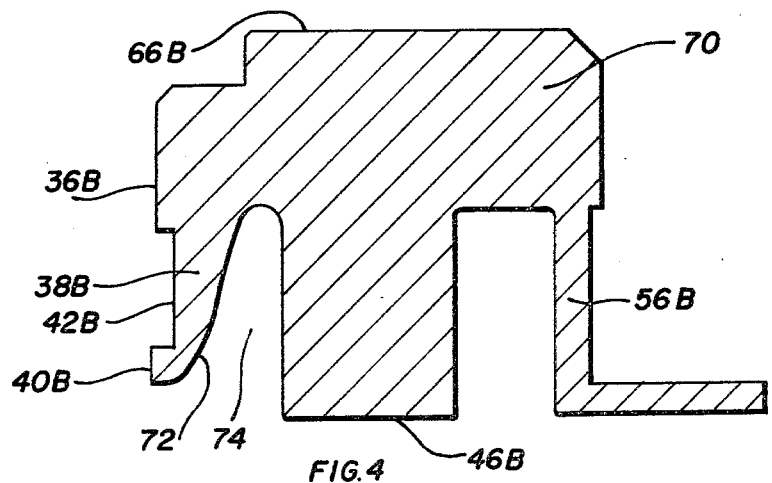
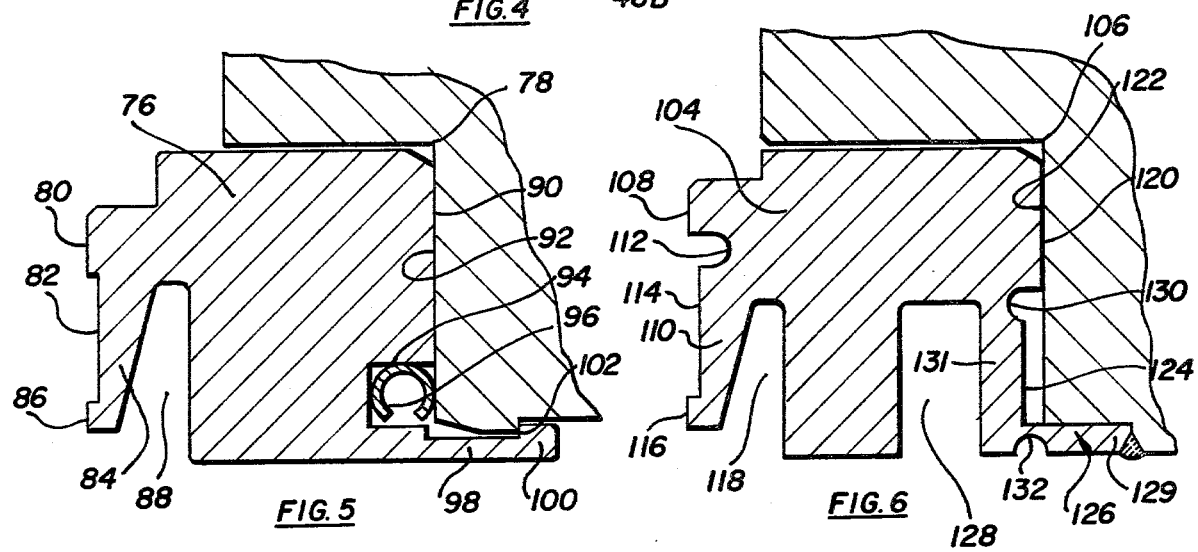
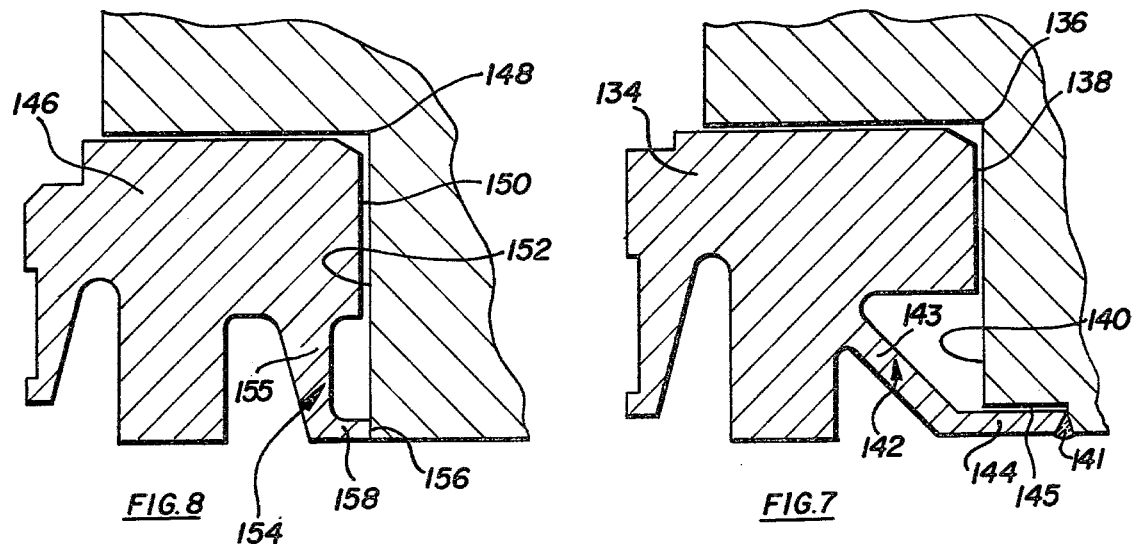

METAL GATE VALVE SEAT HAVING A FLEXIBLE FRONT LIP FACE SEAL

BACKGROUND OF THE INVENTION

This invention is related to metallic seats for gate valves which are designed to operate in a significantly elevated thermal environment and to carry heated fluids. More particularly this invention is related to metal gate valve seats which are sufficiently flexible to maintain a fluid-tight seal with a gate member when the valve is influenced by a high temperature thermal service environment and/or influenced by bending forces which will deform the valve body.

By way of background, the major obstacles involved in constructing valves for operation at high temperatures are concerned with deformation of the valve body in the area of the seats which makes it difficult to achieve sealing with the gate member. When a valve is manufactured the sealing surfaces of the seats, the seat pockets, and the gate are machined to be essentially flat. However, these parts do not remain flat once the valve is in operation carrying a high temperature lading or where it is located in a relatively high temperature environment. Generally, a valve is in a high temperature environment because it is carrying a high temperature lading. For purposes of this description high temperature denotes any temperature above approximately 300° F. When a valve carries a high temperature lading, a thermal gradient is established between the center portion of the valve and its exterior which is cooler. This thermal gradient causes warping or deforming of the valve body and the seats, therefore, the previously flat surfaces are no longer flat and will no longer seal as they would at room temperature. In addition to deteriorating the seal because of the non-flat surfaces, the warping also causes excessive pressure to be exerted on the gate member along its opposite sides of the transverse extremities of the seats. The result of this excessive pressure is galling of the gate in the zones which are subjected to the high pressures.

In regard to the metal valve seat art, several all metal seat constructions are known for gate valves. However, these seat constructions do not have the combination of critically important features which are present in the subject invention. An early attempt at a flexible metal face seal is shown in the patent of Wolff, U.S. Pat. No. 1,756,616 issued Apr. 29, 1930. This seat is formed integral with the valve body and includes a flexible lip, one side of which is the sealing surface that contacts the gate. Because this seat is part of the body it will not compensate for thermally induced deformations of the valve body. The patent of Stevens, U.S. Pat. No. 1,489,857 issued Apr. 8, 1924, discloses a metal seal having a rigid inner member and a flexibly supported outer seal member. In the Stevens patent the rigidly supported inner member is secured to the valve body and can be deformed with the valve body. Thus, it will be subject to the disadvantages of rigid seats discussed above. Although this seat has a flexible element, its location will let line pressure move it away from the gate once the inner member leaks. The patents of Holzer, U.S. Pat. No. 2,772,848 issued Dec. 4, 1956, and Bryant, U.S. Pat. No. 2,777,664 issued Jan. 15, 1957, also disclose metal seats. Both of these patents disclose seat constructions which have a flexible element supporting the face seal that will flex some to accommodate distortions of the valve body. In both of these seat constructions this allowance for deformation would only be possible in slab gate valves and would not function in valves where the gate expands laterally for sealing because such lateral expansion with these seat constructions would urge the seats into essentially rigid contact with the valve body, thus obviating the effectiveness of the flexible element.

SUMMARY OF THE INVENTION

This invention is concerned with a seat assembly for an all metal gate valve having annular seat pockets around flow passageways opening to the valve chamber and having an expandable gate assembly mounted in the valve chamber which is laterally expanded when in the open and closed positions. Annular metal seats are mounted in each of the seat pockets with each seat having a front face and a back face. The front face of each seat has an essentially planar annular outer seal surface around on outer peripheral portion thereof and an annular lip extending radially inward from the annular outer seal surface. The lip is tapered from its bore to its extending free end and the free end has an inner seal surface in concentric relation to the outer seal surface and projecting toward the gate assembly beyond the outer seal surface when unrestrained. This lip is sufficiently flexible to maintain fluid-tight sealing contact with the gate upon deformation of the valve body and the seat even if the deformation is sufficient to separate a portion of the seat outer seal surface from the gate. The back face of the seat has an essentially planar back seal surface around its outer peripheral portion and a flexible metal element extends from the back face and seals with the valve body at the associated passageway. When the gate member is transversely expanded in the open and closed positions, then opposed sides of the gate deflect the lip and bring the gate into flush surface contact with the front outer seal surface. The flexible element allows the valve body, the seat pocket and even the seat to deform yet retains a fluid seal between the fluid flow passageway and the interior of the valve seat. Additionally, the flexible element functions as a spring or a retainer to hold the seat against the bottom of the seat pocket.

One object of this invention is to provide a metallic valve seat structure overcoming the aforementioned disadvantages of the prior art devices.

Still, one other object of this invention is to provide a metallic valve seat structure having a deformable tapered lip on a front face portion thereof which has a maximum deflection for a given load and will remain in contact with the sealing surface of a gate even if the seat member and valve body are deformed due to the operating environment of the valve.

Still another object of this invention is to provide a metallic valve seat structure which has a flexible metal element extending from the back face of the seat to the valve body at the associated passageway to seal around the seat member while allowing the seat member to float in the seat pocket upon deformation of the valve body due to the operating environment of the valve.

Various other objects, advantages, and features of this invention will become apparent to those skilled in the art from the following discussion, taken in conjunction with the accompanying drawing, in which:

DESCRIPTION OF THE DRAWING

FIG. 4 is an enlarged cross-sectional elevation view of another embodiment of the seat of this invention wherein the back side of the tapered lip is curved;

FIG. 5 is an enlarged cross-sectional elevation view of a further embodiment of the seat of this invention shown with a fragment of the seat pocket wherein the seat clips in place in the seat pocket and has an annular seal ring in the back face portion thereof;

FIG. 6 is an enlarged cross-sectional view of another embodiment of the seat shown with a fragment of the seat pocket wherein the seat is provided with notches at deflectable portions thereof;

FIG. 7 is a cross-sectional view of an additional embodiment of the seat shown with a fragment of the seat pocket wherein the flexible metal element on the back face thereof is welded to the interior of the flow passageway; and FIG. 8 is a cross-sectional view of another embodiment of the seat shown mounted in a fragment of the seat pocket wherein the flexible element on the back face of the seat has a lip engaging the valve body.

Figures 1, 2, 3:
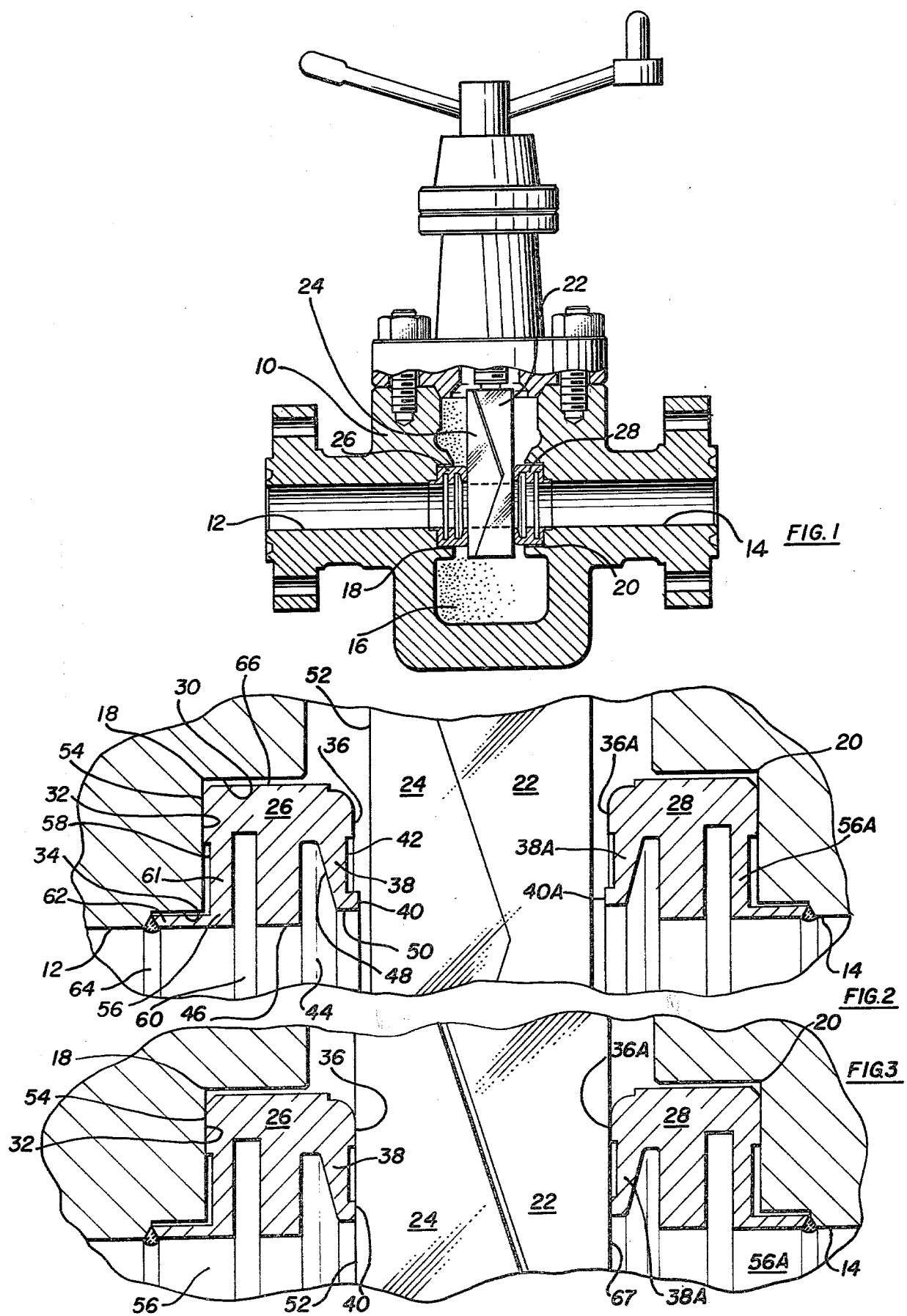
FIG. 1 is a partially cutaway elevation view of a gate valve employing the improved seat assembly of this invention with the valve shown in the open position.
FIG. 2 is an enlarged cross-sectional fragmentary view of the valve shown in FIG. 1 illustrating a portion of the upstream and downstream seat assemblies and the gate with the gate being in a collapsed condition spaced from the seat assemblies.
FIG. 3 is an enlarged cross-sectional fragmentary view of the valve shown in FIG. 1 illustrating a portion of the upstream and downstream seat assemblies and with the gate shown in a completely expanded condition in sealing contact with the seat assemblies.

The following is a discussion and description of preferred specific embodiments of the metal gate valve seat of this invention, such being made with reference to the drawings, whereupon the same reference numerals are used to indicate the same or similar parts and/or structure. It is to be understood that such discussion and description is not to unduly limit the scope of the invention.

DETAILED DESCRIPTION

FIG. 1 shows a gate valve employing the seat assembly of this invention wherein a seat is positioned in each of the seat pockets of the valve and the expandable gate assembly is shown in the open position. The valve shown in FIG. 1 includes a valve body 10 with an inlet passageway 12 and an outlet passageway 14 communicating with a valve chamber 16. Annular seat pockets 18 and 20 are formed in valve body 10 at the inlet and outlet flow passageways respectively. The expandable gate assembly includes a gate 22 and a segment 24 that are mounted in valve chamber 16 for movement between open and closed positions. The expanding gate assembly expands transversely when in the open and closed positions due to sliding movement of segment 24 on inclined surfaces of gate 22. The expanding gate assembly assumes a collapsed position during motion between open and closed positions. One seat member is mounted in each of the seat pockets with the seat member at inlet passageway 12 indicated at 26 and the seat member at outlet passageway 14 indicated at 28. FIGS. 2 and 3 show a portion of both seat members 26 and 28 in their associated seat pockets with adjoining portions of gate 22 and segment 24 in enlarged detail.

Referring to FIG. 2 the expanding gate assembly is shown in a collapsed position such that outer surfaces of gate 22 and segment 24 are spaced from the respective seat members. Both seat members 26 and 28 are constructed identically and for this reason only seat member 26 will be described in complete detail. Portions of seat member 28 which are identified later in the description will be referred to by the numeral placed on seat member 26 followed by "A".

Seat pocket 18 has an outer peripheral wall 30 which is generally axially aligned with inlet passageway 12, a bottom wall 32 which is transverse to inlet passageway 12, and a shallow stepped portion 34 joining bottom wall 32 around the bore of inlet passageway 12 and forming an annular recess. Seat member 26 has a front face adjacent to the expanding gate assembly and a back face residing in seat pocket 18. The front face of seat member 26 includes a planar outer annular seal surface 36 around the outer peripheral portion thereof, an integral annular lip 38 extending inwardly from the outer portion of the seat, a lip seal surface 40 on the inner perimeter of the lip, and a front face groove 42 around the front face side of the annular lip. Inner seal surface 40 and outer seal surface 36 are in spaced concentric relation. The inner periphery or bore 46 of seat 26 has an annular groove 44 which defines the back side 48 of lip 38. Lip 38 tapers from its base to the extending free end thereof and is of a generally frusto-conical cross-section so that lip 38 is thicker at its base than its free end. Lip 38 terminates at an inner peripheral surface 50 which is preferably larger in diameter than seat bore 46. Lip seal surface 40 preferably extends a small distance beyond the plane of outer seal surface 36 in the direction of the expanding gate assembly so that lip seal surface 40 will initially contact the expanding gate assembly thus causing lip 38 to be deflected before surface 36 contacts the expanding gate assembly. The tapered thickness construction of lip 38 permits the lip to flex in order to maintain lip seal surface 40 in contact with segment sealing surface 52. The flexibility of lip 38 maintains a fluid-tight seal with the segment while compensating for body distortions. Lip 38 acts as a tapered cantilever beam so that a point loading at the end of lip 38 results in a substantially uniform bending stress throughout the length of lip 38. Thus, maximum deflection is obtained without exceeding the allowable bending stress in the lip. Because of the tapered cross-section construction of lip 38, it will compensate for around twice the misalignment that would be compensated by a lip of a uniform cross-section from the same amount of contact force at the end of the lip.

Seat member 26 back face includes a planar back seal surface 54 and a flexible metal element 56 extending from the seat and sealed with the valve body at the associated passageway. Back seal surface 54 rests against seat pocket bottom surface 32. The back face of seat member 26 also includes an annular recess 58. Flexible metal element 56 includes a radially disposed portion 61 and a longitudinally disposed portion or leg 62. The flexible element radially disposed portion 61 is formed between seat back recess 58 and an internal groove 60 about the inner periphery 46 of seat 26. Flexible element longitudinally disposed portion 62 extends at right angles to radially disposed portion 61 and fits within recess portion 34. The interior surface of leg 62 is generally aligned with seat bore 46. Leg 62 is secured to the valve body by a weld bead 64 around the interior of inlet passageway 12. Outer peripheral surface 66 of seat member 26 is spaced from seat outer wall 30. This space provides a clearance around the seat so that deformation of the seat pocket will not restrict movement of the seat member.

When seat member 26 is installed in valve body 10 it is positioned with back seal surface 54 in flush contact with seat pocket bottom surface 32 and flexible metal element 56 is welded to the valve body. When weld bead 64 is placed in the valve a certain amount of shrinkage occurs in the metal adjacent the weld. This shrinkage is compensated for by the deflection of flexible metal element 56. In compensating for this weld shrinkage flexible portion 61 is pulled toward surface 32. By deflecting or flexing in this manner, flexible metal element 56 permits seat back seal surface 54 to remain in flush contact with seat pocket bottom surface 32. When the valve is assembled and while it remains in a non-deformed condition flexible metal element 56 will flex or deform in order to let seat 26 float in seat pocket 18 as the valve body is deformed when the valve is in use. The valve body will deform when carrying a high temperature lading or when subjected to external bending moment forces and this deformation results in the seat pockets changing shape. Typically seat pocket bottom surface 32 which was originally flat is now no longer flat and as a result back seal surface 54 will only contact some portions of bottom surface 32. Because seat member 26 can move within seat pocket 18 it can more closely follow the shape of the adjoining gate sealing surface.

In regard to seat lip 38, it assumes a free standing position as shown in FIG. 2 only when the gate and segment are in the completely collapsed position or when the expanding gate assembly is removed from the valve. It is to be noted that if desired the thickness of the expanding gate assembly can be selected such that even in the completely collapsed condition lip seal surface 40 will remain in contact with the external sealing surfaces of the expanding gate assembly. When gate 22 and segment 24 are in the fully expanded position as shown in FIG. 3, then segment sealing surface 52 is in flush contact with outer seal surface 36 and inner seal surface 40. With the expanding gate assembly in this condition, both seat members 26 and 28 are urged into the bottom of the respective seat pockets. When the valve is in this condition, the inner seal surfaces 40, 40A of the seat members form the primary fluid-tight seal with the associated exterior sealing surface of the expanding gate assembly.

Once the valve is in operation carrying a lading at an elevated temperature of at least about 300° F. then the valve body can be deformed due to the thermal difference between the flow passageways carrying the lading and the exterior of the valve body. The significance of this thermal difference is that it causes distortion of the valve body including the seat pockets while the seat can remain a somewhat planar or flat configuration and rest in sealing contact with the expanding gate assembly as described above. Some deformation of the seat members will occur along with deformation of the valve body and this seat deformation is compensated for by the flexible lip on each of the seat members. The result of this body deformation is that the lip sealing surface of each of the seat members will remain in fluid-tight sealing contact with the expanding gate assembly. It is important to note that deformation of seat members 26 and 28 can be significant enough to displace a portion of the outer sealing surfaces 36 and 36A from the segment sealing surface 52 and gate sealing surface 67 without deteriorating or effecting the primary seal established by the lip seal surfaces 40 and 40A. When the valve is in operation carrying a high temperature lading, opposite top and bottom portions of each seat pocket are deformed by being displaced away from the expanding gate assembly. These top and bottom portions of the seat pockets are those portions of the seat pockets which are respectively the closest to and are farthest away from the valve bonnet. Due to this valve body deformation, the seats will also be deformed in a similar manner because of the pressure exerted on them by the expanding gate assembly. When this deformation of the seats occurs the lip seal surfaces are not deformed because of the flexible nature of the lips; thus, the annular lip seal surfaces remain in fluid-tight contact with the appropriate sealing surfaces of the expanding gate assembly. This unique sealing feature of this invention enables the seats to seal when a valve is operating in a high temperature operating environment. Besides sealing in a high temperature environment, the unique seat construction enables seats to keep a fluid-tight seal when the valve is operated at a lower temperature and subjected to bending moments or forces which would tend to distort the valve body including the seat pockets. The flexible tapered lip feature of this invention is not limited to improving the valve performance during high temperature operation as it will also improve the performance at ambient temperatures. Because the sealing surfaces of a gate, the seats, and the seat pockets cannot be manufactured perfectly flat they inherently have irregularities in the surfaces. These irregularities make it difficult for a rigid seat or even the known prior art seats to seal dependably. Because of the flexible lip and flexible element of this seat construction, the seal on the lip will conform to irregularities in the gate and thus form a fluid-tight seal.

FIG. 4 illustrates another embodiment of the seat of this invention which is shown in an enlarged cross-sectional view removed from the valve body. The seat shown in FIG. 4 is indicated at numeral 70, and the portions of seat 70 which are identical to seat member 26 of the embodiment of FIGS. 1-3 are identified by the same reference numerals as seat member 26 followed by "B". The difference between the seat member 26 and seat member 70 lies in the shape of the back side of the lip construction. Lip 38B is provided with a curved back side surface 72 whereas lip 38 has a straight back side. Seat member 70 has a front internal groove 74 extending from seat bore 46B radially outward relative to the seat bore. Lip back side surface 72 has a cross-sectional curvature approximating that of one-half ($\frac{1}{2}$) of a parabola. Lip back side surface 72 has the portion of greatest curvature adjacent bore 46B and the portion of lesser curvature in the deeper or closed end portion of groove 74. The selection of this parabola curvature is an important feature of this embodiment because it shapes the lip so that theoretically it will deflect a maximum amount for a given load applied to lip sealing surface 40B. This maximum deflection characteristic is important in order for lip 38B to be as flexible as possible so it will remain in contact with the gate assembly under all operation conditions as required.

FIG. 5 illustrates another embodiment of the seat of this invention wherein the seat is indicated at 76 and shown with a portion of seat pocket 78 in a fragment of a valve body. The front face portion of seat member 76 has a planar outer annular seal surface 80, a front face groove 82, a lip 84, a lip face seal surface 86, and a seat front internal groove 88. The back face portion of seat 76 has a planar back seal surface 90 resting in flush surface contact with seat pocket bottom surface 92, a back face groove 94 to receive and mount a split metal seal ring 96, and a flexible element 98 contacting the valve body at the flow passageway. Flexible element 98 extends from back seal surface at 90 into the associated flow passageway. The end of flexible element 98 is provided with an inwardly extending lip 100 that engages over an abutment 102 around the interior of the flow passageway. Flexible element 98 can be formed in a plurality of snap fingers or the like which can easily deflect inward upon movement of the seat into the seat pocket, then expand to secure the seat. Flexible element 98 engages abutment 102 in order to retain the seat in the seat pocket when the seat is snapped into position. Seal ring 96 is sufficiently flexible to seal between the seat and the pocket bottom surface 92 upon deformation of the valve body as described above.

FIG. 6 shows another embodiment of the seat of this invention which is indicated at numeral 104 and shown mounted in a seat pocket 106 in a fragment of a valve body. Seat 104 has a front face portion which includes a flat outer sealing surface 108 around the outer perimeter thereof and a lip 110. An annular notch 112 is provided between outer annular sealing surface 108 and a front annular recess 114 around the front face of lip 110. Lip 110 terminates in an annular sealing surface 116. Lip 110 is formed between the seat front face and a portion of a front internal groove 118 that opens to the bore of the seat. The back face portion of seat 104 includes a back outer annular sealing surface 120, a back recess 124, and a flexible element 126 extending from the seat through the valve body flow passageway. Sealing surface 120 rests in flush contact with a seat pocket bottom sealing surface 122. Flexible element 126 is formed between a back internal seat groove 128 and the back surface of the seat. Element 126 includes leg 129 and base 131 at right angles to leg 129. Annular notch 130 is formed at the juncture of base 131 with surface 130, and annular notch 132 is formed at the juncture of base 131 with leg 129. Notch 132 faces the adjacent flow passageway and notch 130 faces sealing surface 122. Notches 130 and 132 provide thin cross-sectional connections for leg 129 and base 131 of flexible member 126 to facilitate added flexure of the structure to compensate for distortions of the valve body and seat when in use in the high temperature service environment described above. Functionally, seat 104 operates the same as the seats shown in FIGS. 1-3.

FIG. 7 illustrates another embodiment of the seat of this invention indicated at 134 and shown mounted in a seat pocket 136 in a fragment of a valve body. The front face portion of seat 134 is similar to that shown in FIGS. 1-3 and includes an outer annular seal surface, a front face groove, a lip, a lip seal surface, and a seat front internal groove. The back face portion of seat 134 has an outer annular back sealing surface 138 which rests in contact with a bottom seat pocket surface 140, and a flexible element 142. Flexible element 142 is different from the similar element in the above described seats. Flexible element 142 includes an inner base portion 143 which extends from seat 134 at an oblique angle relative to back sealing surface 138, and a cylindrical portion 144 which extends from the inner portion 143 into the associated flow passageway where it is welded at 141 to the valve body at its extreme end portion. The end of cylindrical portion 144 is welded to the valve body inside the flow passageway. A recess 145 is provided in the flow passageway at the seat pocket to receive flexible element cylindrical portion 144 so the interior of this portion generally aligns with the associated flow passageway. A small clearance space can be provided between recess 145 and the outside of flexible element cylindrical portion 144. Cylindrical portion 144 when welded to the valve body inside of the flow passageway causes a shrinkage in the adjacent material. This shrinkage is compensated for by deformation of the flexible element so the seat may rest in flush contact with the seat pocket and not be distorted by the welding. Because of the unique frusto-conical shape of this flexible element it will easily deform to compensate for radial and longitudinal distortions of the valve body and seat.

FIG. 8 shows one further embodiment of the seat of this invention with such indicated at 146 and shown mounted in a seat pocket 148 of a fragment of a valve body. The front face portion of seat 146 is essentially the same as that shown in FIGS. 1-3, and it includes outer annular front seal surface, a front recess, an annular lip, a lip seal surface, and a front internal groove. Seat 146 includes an integral back lip generally indicated at 154 having a base portion 155 extending toward the flow passageway and an extending lip portion 158 at right angles to base portion 155. Lip portion 158 has a flat sealing surface 156. The back face portion of seat 146 has a back sealing surface 150 which can be displaced into flush surface-to-surface sealing contact with seat pocket bottom surface 152 after flexure of lip 154. Sealing surface 156 extends beyond surface 150 in a direction toward surface 152 when unrestrained. Back lip 154 is sufficiently flexible to accommodate deformation of the valve body and particularly the seat pocket bottom surface 152 in order to maintain the sealing integrity of the valve seat. When seat 146 is installed in a valve and the expandable gate assembly is in the fully expanded position, then seat surface 150 and seat pocket surface 152 will be in flush contact with back lip seal surface 156 resting against seat pocket surface 152. In the event the seat pocket is deformed to cause a separation of a portion of surfaces 150 and 152, sealing surface 156 will remain in sealing contact with seat pocket surface 152, thereby preventing leakage around the back side of the valve seat. When a valve equipped with this seat is in a service environment like that discussed above, flexible back lip 154 will maintain contact with seat pocket bottom surface 152 and will deform to accommodate deformation of the seat pocket so the seat can maintain a fluid-tight seal between the gate assembly and the fluid passageway.

It can be seen by one skilled in the art that each of the valve seat constructions shown and described herein function as described to seal against the gate assembly of a valve that is operating in an ambient environment as well as on elevated temperature thermal environment. Because of the unique tapered front face lip and flexible element on the seat back face, each of the seat constructions of this invention will deform to compensate for thermally caused deformations of the valve. The lip shown in FIG. 4 illustrates the ideal theoretical lip back side shape and the others show approximations of this shape which are more practical from a manufacturing standpoint.

What is claimed is:

1. In a gate valve having a valve body with an inlet passageway and an outlet passageway communicating with a valve chamber, annular seat pockets around said passageways and opening to the valve chamber, and a gate assembly mounted in said valve chamber movable between open and closed positions, an improved seat assembly comprising:
   (a) an annular metal seat member mounted in each of said seat pockets, each seat member having a front face, a back face, and an inner peripheral surface facing the associated passageway;
   (b) said front face having an essentially planar annular outer seal surface around the outer peripheral portion thereof, and an annular lip spaced radially inward of said annular outer seal surface, said lip having an inner seal surface at its free end extending beyond said outer seal surface toward said gate assembly when said seat members are in a free position, said lip being sufficiently flexible to maintain fluid-tight sealing contact between said lip seal surface and said gate assembly upon deformation of said valve body, said gate assembly, and said seat member resulting from the thermal environment of the gate valve and any bending moments applied to said valve body;
   (c) said seat back face having an essentially planar back seal surface around the outer peripheral portion thereof and an integral flexible metal element around the inner peripheral portion thereof in fluid-tight relation with said valve body at the associated passageway, said flexible element on each of said seat members having an inner base portion extending inwardly toward its associated passageway and an integral outer portion extending in a direction parallel to the longitudinal axis of the associated passageway, said outer portion being welded to said valve body inside the associated passageway, said flexible element being adapted to deform upon welding of said outer portion to said valve body to compensate for shrinkage resulting from such welding, distortions of said valve body caused by the thermal service environment of said valve, and bending moment forces applied to said valve which would tend to distort said seat pockets whereby said seat lip sealing surface will remain in fluid-tight sealing contact with said gate assembly when said gate assembly is in the open and closed positions;
   (d) said gate assembly being transversely expanded in said open and closed positions with opposed side surfaces of said gate assembly contacting and deflecting said lip and contacting said outer seal surface when said gate assembly is transversely expanded.

2. The valve seat assembly of claim 1, wherein:
   (a) said integral outer portion of said flexible element comprises a leg received within an annular recess of the valve body along the associated passageway adjacent said seat member, and the end of said leg is welded to the valve body at said annular recess.

3. The valve seat assembly of claim 1, wherein:
   (a) the juncture of said inner base portion and said outer portion of the flexible element has an annular notch facing the associated passageway.

4. The valve seat assembly of claim 1, wherein:
   (a) the juncture of said inner base portion with said outer portion of the flexible element has an annular notch facing the associated passageway; and
   (b) the juncture of said inner base portion with the seat has an annular notch facing the bottom surface of the associated seat pocket.

5. In a valve having a valve body defining a valve chamber and a passageway communicating with the valve chamber, an annular seat pocket around said passageway and opening to the valve chamber, and a valve member mounted in said valve chamber movable between open and closed positions, an improved annular metal seat member mounted in said seat pocket, said seat member comprising:
   (a) a front face and a back face, said front face having an annular flexible front lip on an inner peripheral portion thereof and an outer annular seal surface around an outer peripheral portion thereof adjacent said lip, said front lip having on its free end an annular inner seal surface extending toward said valve member beyond said outer annular seal surface when in a free position, said front face having a groove therein between said inner and outer seal surfaces to separate said seal surfaces, the inner peripheral surface of said metal seat member having an annular groove therein defining the back surface of said annular lip, said lip tapering outwardly from the free end thereof to form a base of increased thickness; and
   (b) a flexible back lip extending from the back face of said seat member, the adjacent peripheral surface of said seat member having a groove therein defining a front surface of the flexible back lip.

6. In a valve as set forth in claim 5, wherein said flexible back lip is welded to said valve body at a position inside the associated passageway.

7. In a valve having a valve body defining a valve chamber and a passageway communicating with the valve chamber, an annular seat pocket around said passageway facing the valve chamber, and a valve member mounted in said valve chamber movable between open and closed positions, an improved metal seat member mounted in said pocket, said seat member comprising:
   (a) a body of a generally rectangular cross-section having a front face adjacent the valve member and an opposed back face, said front face having an annular flexible front lip on an inner peripheral portion thereof and an outer annular seal surface around an outer peripheral portion thereof adjacent said lip, said front lip having on its free end an inner seal surface extending toward said valve member beyond said outer annular seal surface when in a free position, the inner peripheral surface of said metal seat member having an annular groove therein defining the back surface of said annular lip; and
   (b) an inner flexible back lip extending from the back face of said seat member adjacent the inner periphery thereof, the inner peripheral surface of said seat member having a second annular groove therein defining a front surface of the flexible back lip, said back lip being welded to said valve body at a position inside the associated passageway.

8. In a valve having a valve body defining a valve chamber and a passageway communicating with the valve chamber, an annular seat pocket around said passageway and opening to the valve chamber, and a valve member mounted in said valve chamber movable between open and closed positions, an improved annular metal seat member mounted in said seat pocket, said seat member comprising:

(a) a front face and a back face, said front face having an annular flexible front lip on an inner peripheral portion thereof and an outer annular seal surface around an outer peripheral portion thereof adjacent said lip, the inner peripheral surface of said metal seat member having an annular groove therein defining the back surface of said annular lip, said lip tapering outwardly from the free end thereof to form a base of increased thickness; and (b) a flexible element extending from the back face of said seat member, the adjacent inner peripheral surface of said seat member having a groove therein defining a front surface of the flexible element, said flexible element including an integral leg extending in a direction parallel to the longitudinal axis of the passageway and being received within an annular recess of the valve body along the associated passageway adjacent the seat pocket, said leg having an extending end welded to the valve body at said annular recess.

9. In a valve having a valve body defining a valve chamber and a fluid passageway communicating with the valve chamber, an annular seat pocket around said passageway facing the valve chamber, and a valve member mounted in said valve chamber movable between open and closed positions, an improved one-piece metal seat member mounted in said pocket, said seat member comprising:

(a) an annular body having a front face adjacent the valve member and an opposed back face with an inner peripheral surface extending between the faces, said front face having an annular flexible front lip on an inner portion thereof and an outer annular seal surface around an outer portion thereof adjacent said lip, said inner peripheral surface of said annular body having an annular groove therein which opens to the passageway and defines the back surface of said annular front lip;

(b) said back face having an inner flexible back lip extending from an inner portion thereof, said inner peripheral surface of said annular body having a second annular groove therein in generally parallel spaced relation to said first annular groove, said second annular groove opening to the passageway and defining a front surface of the flexible back lip.

* * * * *